US012762565B2

(12) United States Patent
Das et al.

(10) Patent No.: US 12,762,565 B2
(45) **Date of Patent: *Oct. 13, 2026**

(54) SYSTEMS AND METHODS FOR GENERATING MODELS FOR CLASSIFYING IMBALANCED DATA

(71) Applicant: Synchrony Bank, Stamford, CT (US)

(72) Inventors: Amitabha Das, Naperville, IL (US); Akhil Sajitha Sreehari, Chicago, IL (US); Tianyue Mao, Palo Alto, CA (US); Kexuan Zou, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 220 days.

This patent is subject to a terminal disclaimer.

(21) Appl. No.: 18/769,948

(22) Filed: Jul. 11, 2024

(65) Prior Publication Data

US 2024/0394714 A1 Nov. 28, 2024

Related U.S. Application Data

(63) Continuation of application No. 17/197,290, filed on Mar. 10, 2021, now Pat. No. 12,067,571.

(60) Provisional application No. 62/988,305, filed on Mar. 11, 2020.

(51) Int. Cl.

| | |
|---|---|
| ***G06Q 20/40*** | (2012.01) |
| ***G06F 18/2413*** | (2023.01) |
| ***G06N 20/00*** | (2019.01) |
| ***G06Q 20/20*** | (2012.01) |
| ***G06Q 20/38*** | (2012.01) |

(52) U.S. Cl.

CPC ..... *G06Q 20/4016* (2013.01); *G06F 18/2413* (2023.01); *G06N 20/00* (2019.01); *G06Q 20/20* (2013.01); *G06Q 20/382* (2013.01)

(58) Field of Classification Search

CPC ................................................ G06Q 20/4016

USPC ........................................................... 706/12

See application file for complete search history.

(56) References Cited

U.S. PATENT DOCUMENTS

| | | | | |
|---|---|---|---|---|
| 10,062,013 | B2 * | 8/2018 | Romanenko | G06F 18/211 |
| 10,825,449 | B1 * | 11/2020 | Chinnalagu | G10L 15/1815 |
| 11,087,221 | B2 * | 8/2021 | Al-Harbi | G06N 5/04 |
| 11,537,820 | B2 * | 12/2022 | Brown | G06F 16/358 |

(Continued)

OTHER PUBLICATIONS

Pat Walters, "Some Thoughts on Comparing Classification Models" available online at [https://practicalcheminformatics.blogspot.com/2020/05/some-thoughts-on-comparing.html], published on May 13, 2020. (Year: 2020).*

(Continued)

*Primary Examiner* — Reza Nabi
(74) *Attorney, Agent, or Firm* — Polsinelli PC

(57) ABSTRACT

A classification modeling system receives a request to identify a classification model from a set of classification models. The request includes a data set and specifies one or more metrics for evaluating performance of the set of classification models in classifying data from the data set. The system uses the set of classification models to generate a set of classifications and determines the performance of the set of classification models based on the set of classifications and according to the one or more metrics. Based on the performance of the set of classification models, the system selects a classification model and provides the classification model to fulfill the request.

21 Claims, 7 Drawing Sheets

(56) References Cited

U.S. PATENT DOCUMENTS 11,562,167 B2 * 1/2023 Yoon ........................ G06F 18/22
11,640,559 B2 * 5/2023 Raveh .................... G06V 10/84 382/159
11,663,409 B2 * 5/2023 Terry ...................... G06F 16/34 706/12
11,676,060 B2 * 6/2023 Roychowdhury ..... G06N 20/00 706/12
11,707,837 B2 * 7/2023 Oleynik ................. G05B 19/42 700/250
2014/0279760 A1 * 9/2014 Aliferis .................. G06N 20/00 706/12
2015/0012465 A1 * 1/2015 Pingenot ................ G06N 5/025 706/12
2015/0262184 A1 * 9/2015 Wang ................. G06Q 20/4016 705/44
2015/0263925 A1 * 9/2015 Shivashankar ....... H04L 67/535 709/224
2015/0332169 A1 * 11/2015 Bivens ................... G06N 20/00 706/12
2015/0354336 A1 * 12/2015 Maurice ................. G06Q 50/02 700/275
2016/0005029 A1 * 1/2016 Ivey ......................... G09C 1/00 705/44
2016/0078359 A1 * 3/2016 Csurka ................. G06V 10/776 706/12
2016/0110657 A1 * 4/2016 Gibiansky ............. G06N 20/00 706/12
2017/0193558 A1 * 7/2017 Lyons ..................... G06F 18/28
2017/0351956 A1 * 12/2017 Dubey .................. G06F 16/355
2018/0024968 A1 * 1/2018 Clinchant .............. G06N 3/045 706/12
2018/0293292 A1 * 10/2018 Odibat ................ G06F 16/9535
2019/0087685 A1 * 3/2019 Wu ........................ G06N 20/00
2019/0102701 A1 * 4/2019 Singaraju .............. G10L 15/063
2019/0378050 A1 * 12/2019 Edkin .................... G06N 20/20
2020/0051087 A1 * 2/2020 Adjaoute ........... G06Q 20/4016
2021/0073591 A1 * 3/2021 Zhong .................... G06V 10/82
2021/0200955 A1 * 7/2021 Ben Kimon ........... G06N 3/044
2021/0224593 A1 * 7/2021 Wu ...................... G06Q 10/107
2021/0241113 A1 * 8/2021 Finn ................... G06V 10/7715
2021/0287136 A1 * 9/2021 Das ........................ G06Q 20/20
2021/0287222 A1 * 9/2021 Schmidt ................. G06N 20/00
2021/0295213 A1 * 9/2021 Raveh .................... G06N 20/20
2021/0374470 A1 * 12/2021 Zhang ..................... G06F 18/25
2022/0027799 A1 * 1/2022 Momo .................. G06F 16/906
2022/0067458 A1 * 3/2022 Wang .................. G06F 18/2113
2022/0076081 A1 * 3/2022 Jeong ..................... G06F 18/217
2022/0083571 A1 * 3/2022 Schmidt ................ G06F 16/285
2022/0114456 A1 * 4/2022 Nouri .................... G06F 18/214
2022/0261690 A1 * 8/2022 Katoh .................... G06N 20/00
2022/0383322 A1 * 12/2022 Butvinik ............ G06Q 20/4016
2023/0075932 A1 * 3/2023 Sikka ................... G06N 3/0464
2023/0097897 A1 * 3/2023 Campos ................. G06N 5/022 706/12
2023/0098656 A1 * 3/2023 Zhang .................... G06N 20/20 706/12
2023/0140702 A1 * 5/2023 Bodigutla ........... G06F 18/2178 706/12
2023/0141886 A1 * 5/2023 Hu ....................... G06V 10/776 706/12
2023/0143072 A1 * 5/2023 Flöther .................. G06N 10/60 706/12
2023/0145919 A1 * 5/2023 Ozay ...................... G06N 20/00 706/12
2023/0186311 A1 * 6/2023 Vimal .................... G06Q 40/02 705/44
2023/0214518 A1 * 7/2023 Raghunathan ........ G06F 16/285 726/26
2023/0267468 A1 * 8/2023 Tholar ................... G06Q 90/00 706/12
2023/0273121 A1 * 8/2023 Hsiung ................. G06F 18/217 356/303
2023/0306429 A1 * 9/2023 Shachar ................. G06N 20/00
2024/0062218 A1 * 2/2024 Young .................. G06Q 20/401

OTHER PUBLICATIONS

Office Action mailed May 6, 2025 in U.S. Appl. No. 18/045,867.
Office Action mailed Aug. 18, 2025 in U.S. Appl. No. 18/045,867.
Office Action mailed Dec. 8, 2021 in U.S. Appl. No. 17/197,324.
Notice of Allowance mailed Jul. 14, 2022 in U.S. Appl. No. 17/197,324.
Balaji G. N. et al., "Machine Learning Approaches for Credit Card Fraud Detection," International Journal of Engineering & Technology, vol. 7, No. 2, Jun. 2018, pp. 917-920.
Chapman, Aub et al., "Controlling Financial Services Fraud," Trends & Issues in Crime and Criminal Justice, No. 189, Canberra: Australian Insitute of Criminology, Jan. 2, 2001.
Lakshmi, P. et al., "Forensic Accounting: A Checkmate for Corporate Fraud," Journal of Modern Accounting and Auditing, vol. 12, Sep. 28, 2016.
Office Action mailed Aug. 7, 2023 in U.S. Appl. No. 18/045,867.
Office Action mailed Feb. 29, 2024 in U.S. Appl. No. 18/045,867.
Walters, Pat, "Some Thoughts on Comparing Classification Models" available online at [https://practicalcheminformatics.blogspot.com/2020/05/some-thoughts-on-comparing.html], published on May 13, 2020. (Year: 2020).
Notice of Allowance mailed Apr. 19, 2024 in U.S. Appl. No. 17/197,290.
Office Action mailed Sep. 5, 2024 in U.S. Appl. No. 18/045,867.

* cited by examiner

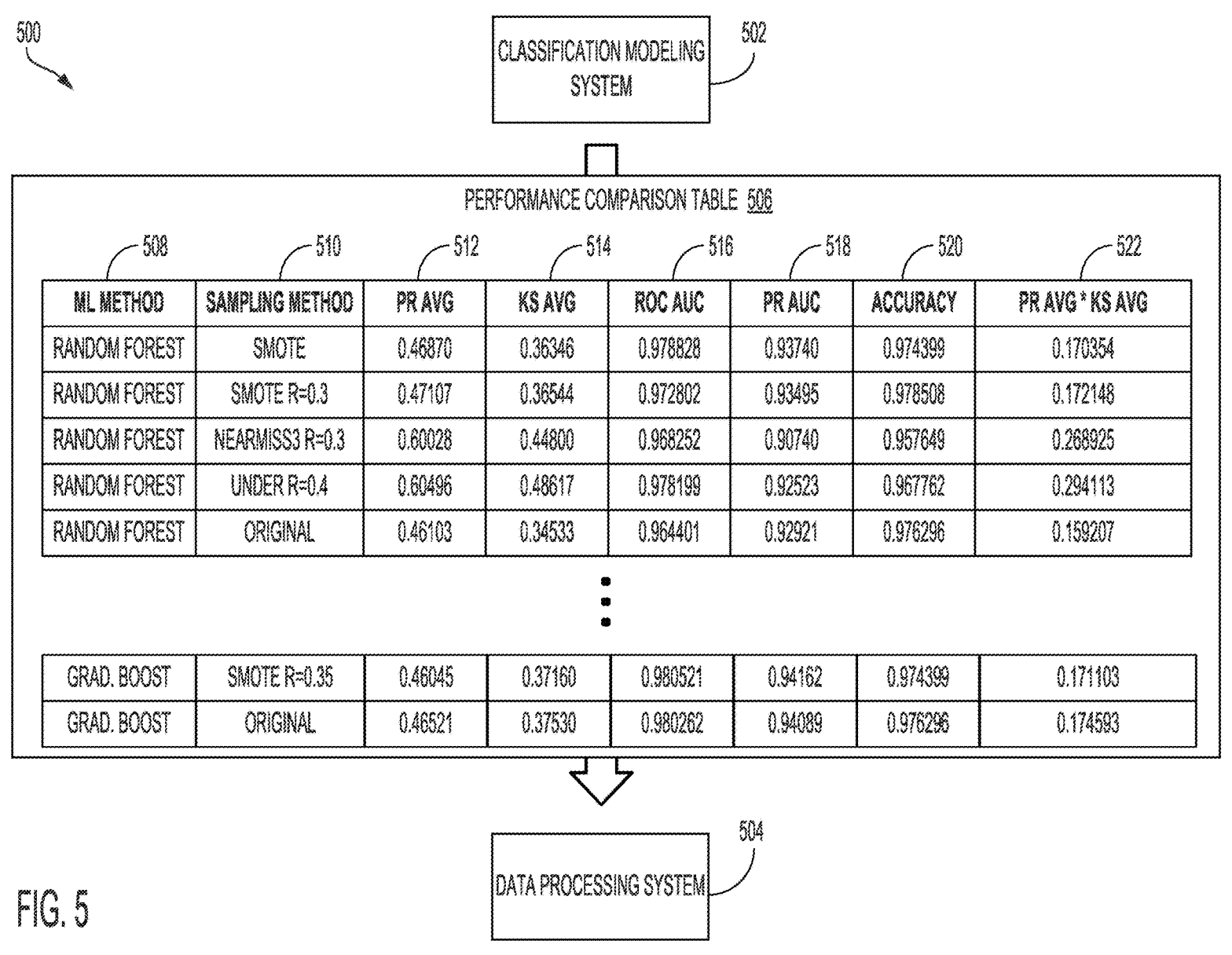

500

CLASSIFICATION MODELING SYSTEM 502

PERFORMANCE COMPARISON TABLE 506

| ML METHOD (508) | SAMPLING METHOD (510) | PR AVG (512) | KS AVG (514) | ROC AUC (516) | PR AUC (518) | ACCURACY (520) | PR AVG * KS AVG (522) |
|---|---|---|---|---|---|---|---|
| RANDOM FOREST | SMOTE | 0.46870 | 0.36346 | 0.978828 | 0.93740 | 0.974399 | 0.170354 |
| RANDOM FOREST | SMOTE R=0.3 | 0.47107 | 0.36544 | 0.972802 | 0.93495 | 0.978508 | 0.172148 |
| RANDOM FOREST | NEARMISS3 R=0.3 | 0.60028 | 0.44800 | 0.968252 | 0.90740 | 0.957649 | 0.268925 |
| RANDOM FOREST | UNDER R=0.4 | 0.60496 | 0.48617 | 0.978199 | 0.92523 | 0.967762 | 0.294113 |
| RANDOM FOREST | ORIGINAL | 0.46103 | 0.34533 | 0.964401 | 0.92921 | 0.976296 | 0.159207 |
| ⋮ | | | | | | | |
| GRAD. BOOST | SMOTE R=0.35 | 0.46045 | 0.37160 | 0.980521 | 0.94162 | 0.974399 | 0.171103 |
| GRAD. BOOST | ORIGINAL | 0.46521 | 0.37530 | 0.980262 | 0.94089 | 0.976296 | 0.174593 |

DATA PROCESSING SYSTEM 504

FIG. 5

SYSTEMS AND METHODS FOR GENERATING MODELS FOR CLASSIFYING IMBALANCED DATA

CROSS-REFERENCE TO RELATED APPLICATION

The present application is a continuation of U.S. patent application Ser. No. 17/197,290 filed Mar. 10, 2021, now U.S. Pat. No. 12,067,571, which claims the benefit of U.S. Provisional Application 62/988,305 filed on Mar. 11, 2020, which are incorporated herein by reference in their entireties.

FIELD

The present disclosure relates generally to classifying data. In one example, the systems and methods described herein may be used to generate machine learning models for classifying imbalanced data, such as majority data which shares a first characteristic and minority data which shares a second characteristic.

BACKGROUND

Organizations often rely on classification models to separate data into different classes. For instance, an organization can process pending transactions using a classification model to determine whether any given transaction is authentic or fraudulent. However, the binary classification of data using classification models can be difficult. In some instances, the input data can disproportionately have more data associated with one class than with the other (e.g., class imbalance). For example, in a data set including authentic and fraudulent transactions, the number of authentic transactions may greatly outnumber the number of fraudulent transactions. This poses a problem for training classification models because a classification model may be biased towards the majority class, resulting in classification errors.

Various methods exist to address the class imbalance problem. For instance, different sampling and classification algorithms can be used to, in combination, classify an imbalanced data set into different classes. However, identifying which combination of sampling and classification algorithms will produce the best results (e.g., classifications) for a given data set can be difficult. For instance, a particular algorithm combination may perform well for one metric of evaluation but not necessarily for others. This can result in the training of a classification model that may not be well suited for classifying a particular data set. Further, testing different algorithm combinations can be computationally extensive, particularly when provided with no guidelines for determining which combination would provide desired results for a given data set.

SUMMARY

Disclosed embodiments may provide a system for building a classification model that can classify imbalanced data. The system has a vast range of sampling methods, algorithms, and configuration choices to help narrow down the model space to a set of models that provide a desired performance level. Metrics may be applied that are more sensitive and effective as compared to traditional metrics used to quantify the quality of a model.

According to some embodiments, a computer-implemented method is provided. The computer-implemented method comprises receiving a request to identify a classification model from a set of classification models, wherein the request includes a data set including first data associated with a first characteristic and second data associated with a second characteristic, and wherein the request specifies one or more metrics for evaluating performance of the set of classification models. The method further comprises using the set of classification models to generate a set of classifications. A classification of the set of classifications includes classifying the first data into majority data based on the first characteristic and the second data into minority data based on the second characteristic. The method further comprises determining the performance of the set of classification models based on the set of classifications and according to the one or more metrics. The method further selecting the classification model. The classification model is selected based on the performance of the set of classification models according to the one or more metrics. The method further comprises providing the classification model and a classification generated by the classification model using the data set.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 5 shows an illustrative example of an environment in which a classification modeling system generates a performance comparison table that specifies various output metrics for different machine learning algorithm and sampling algorithm combinations in accordance with at least one embodiment;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to evaluate different classification models subject to a set of metrics and criteria for the classification of imbalanced data. For example, in response to a request, a classification modeling system can use a data set as input to one or more classification models to generate a set of classifications for the data set. The classification modeling system may evaluate this set of classifications based on different metrics to determine the performance of each of these classification models. Additionally, the classification modeling system can select, from these one or more classification models, a classification model that satisfies the criteria provided by a requestor for classifying data sets in accordance with the provided criteria.

Imbalanced data refers to a classification problem where the classes are not represented in an equal manner. Classification is a machine learning problem where an attempt is made to identify to which set of categories a new observation belongs. When a classification model attempts to classify highly imbalanced data into either majority data or minority data, the classification model tends to classify data into the majority class. Even if a high level of accuracy is obtained, the classification model may not be effective since the minority class may not be efficiently identified. This is because the classification model may be provided with a comparatively lesser number of minority class samples for it to learn and identify the nuances surrounding it. Many real-world classification problems like fraud detection, loss forecasting, anomaly detection, customer promotion suffer from this issue.

Figure 1:
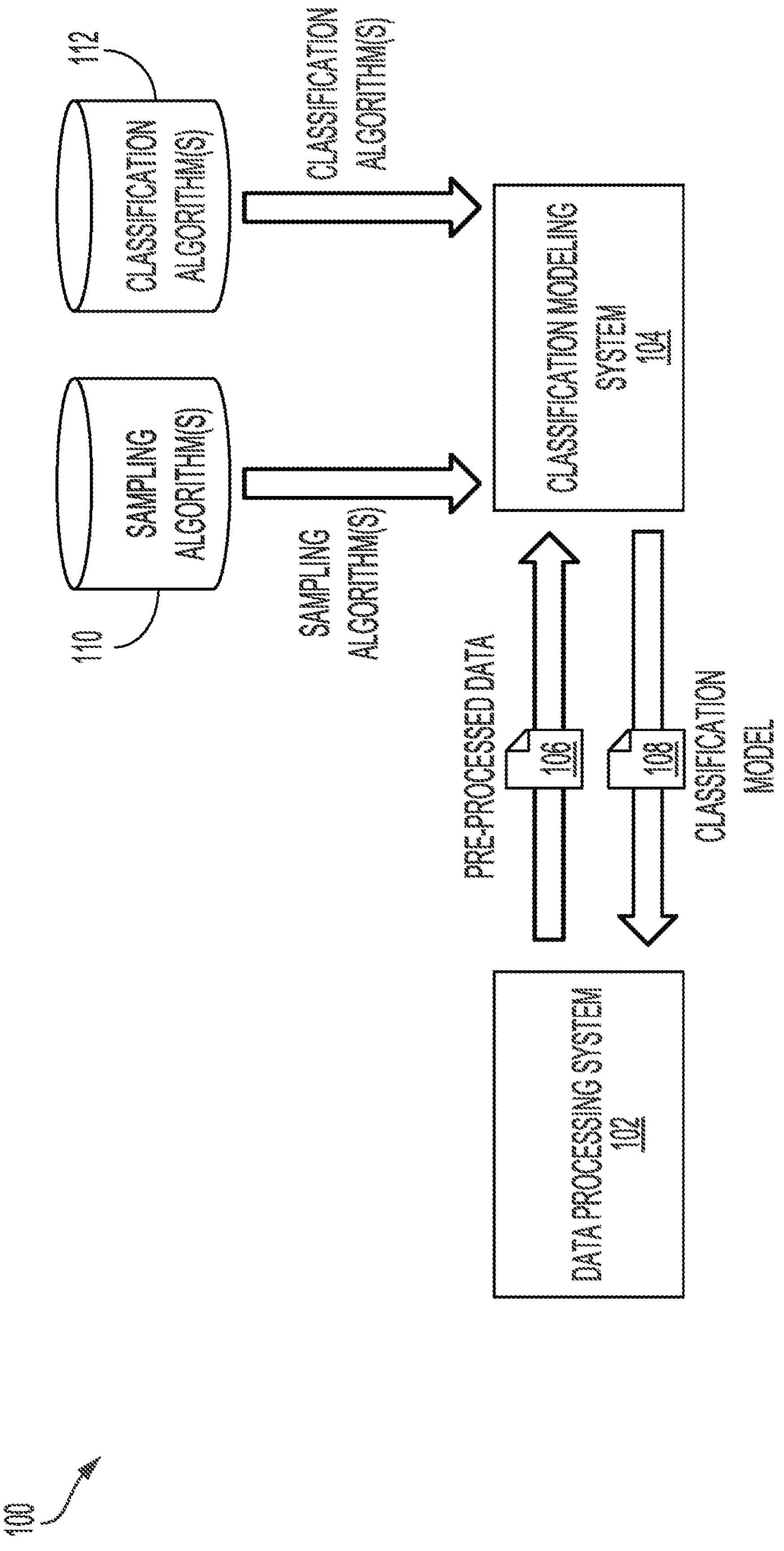
FIG. 1 shows an illustrative example of an environment in which a classification modeling system utilizes a data set as input to combinations of classification algorithms and sampling algorithms to derive a classification model that satisfies one or more criteria in accordance with various embodiments.

FIG. 1 shows an illustrative example of an environment 100 in which a classification modeling system 104 utilizes a pre-processed data set 106 as input to combinations of machine learning algorithms and sampling algorithms to derive a classification model 108 that satisfies one or more criteria in accordance with various embodiments. In the environment 100, a data processing system 102 transmits a request to a classification modeling system 104 to provide a classification model 108 that satisfies one or more criteria for processing and classifying data sets. The data processing system 102 may include a computer system, application, or other entity that obtains and processes incoming data from different sources. For example, the data processing system 102 may process fraudulent transactions from one or more suspicious clients and authentic transactions from authentic clients to generate a data set 106 that includes fraudulent transaction data and authentic transaction data. The data processing system 102 may have previously performed a classification of the data points within the data set, such that each data point of the data set 106 is known as either corresponding to a first classification (e.g., authentic transactions, etc.) or a second classification (e.g., fraudulent transactions, etc.). Thus, the data set 106 generated by the data processing system 102 may be used to evaluate the performance of various classification models.

In an embodiment, the data set 106 comprises imbalanced data. Imbalanced data refers to a classification problem where the classes (e.g., fraudulent transactions and authentic transactions, etc.) are not represented in an equal manner. For instance, the number of fraudulent transactions processed by the data processing system 102 may be several orders of magnitude lower than the number of authentic transactions processed by the data processing system 102. In other words, the number of observed transactions that are not fraudulent may far outweigh the number of observed transactions that are fraudulent. Thus, the data points corresponding to authentic transactions may correspond to a majority class, whereas the data points corresponding to fraudulent transactions may correspond to a minority class. It should be noted that while financial transactions are used extensively throughout the present disclosure for the purpose of illustration, other forms of data may be used to construct the data set 106 and to perform evaluations of different classification models subject to criteria tied to the type of data utilized.

It should be noted that while the data set 106 may be provided by the requestor (e.g., data processing system 102), the data set 106 may be obtained from alternative sources. For instance, the request may alternatively specify a location (e.g., network address, etc.) where the data set 106 may be obtained. In some instances, the data processing system 102 may indicate, in the request, that the classification modeling system 104 is to use a sample data set maintained by the classification modeling system 104 for the training and evaluation of various classification models. In some instances, the request may specify what type of data set is to be used (e.g., data sets including transaction data, data sets including other data, etc.). This may cause the classification modeling system 104 to obtain the data set 106 from a data repository maintained by the classification modeling system 104 or from a third-party provider that maintains sample data sets for use in evaluating the performance of various classification models.

In an embodiment, the data processing system 102 provides, in its request to the classification modeling system 104, the data set 106 and a set of criteria for evaluating different combinations of classification algorithms and sampling algorithms and, based on this evaluation, generating a classification model 108 that satisfies the set of criteria. The set of criteria may include different requirements for determining how the data set 106 is to be processed in order to address any data imbalance detected as a result of classification of the data set 106. Additionally, or alternatively, the set of criteria may include a threshold for the accuracy of the desired classification model in classifying the various data points as corresponding to either a majority or minority class. The set of criteria may include additional and/or alternative metrics that may be used by the classification modeling system 104 to identify a desired classification model 108.

The request from the data processing system 102 may further define different combinations of classification algorithms and sampling algorithms that may be evaluated in order to identify one or more classification models (e.g., classification algorithm and sampling algorithm combinations) that satisfy the set of criteria. For instance, the data processing system 102 may select, from a set of available sampling algorithms 110 and classification algorithms 112 utilized by the classification modeling system 104, one or more sampling algorithms that may be used to generate a sampling of the data points of the data set and one or more classification algorithms that may be used to classify this sampling of the data points. For instance, to address the potential of misclassification of imbalanced data, the classification model 108 may be constructed with a sampling algorithm or model to perform re-sampling of the data set 106. For instance, re-sampling may be performed via under-sampling (e.g., removing data points from the majority class) of the data set and/or over-sampling (e.g., adding data points from the minority class) of the data set. Example under-sampling algorithms may include random under-sampling, cluster centroid, Near Miss 1, Near Miss 2, Near Miss 3, Repeated Edited Nearest Neighbors (RENN), Condensed Nearest Neighbors (CNN), instance hardness threshold, One-Sided Selection using Tomek links (OSS), Neighborhood Cleaning Rule (NCR) algorithms, and the like. Examples of over-sampling algorithms may include random over-sampling, Synthetic Minority Over-Sampling Technique (SMOTE), the adaptive synthetic sampling approach (ADASYN), and the like.

The random under-sampling algorithm may select all data points of the data set 106 corresponding to fraudulent transactions (e.g., minority class) and obtain a random sampling of data points corresponding to authentic transactions (e.g., majority class). This random sample may be determined by selecting a particular ratio for majority-to-minority data points for the classification model. For example, if the data set 106 includes $n_1$ data points corresponding to fraudulent transactions, and the desired ratio for under-sampling is a N:1 ratio of authentic transaction data points to fraudulent transaction data points, the algorithm may be used to select $N*n_1$ data points from the set of authentic transaction data points.

The Near Miss 1 algorithm may be used to perform under-sampling of data points in the majority class based on their distance to other points in the same class using a k-nearest neighbors (kNN) algorithm. The kNN algorithm is a non-parametric, lazy learning algorithm that is used on data sets in which the data points are separated into several classes to predict the classification of a new sample data point. Thus, the kNN algorithm is based on feature similarity, whereby the algorithm is used to determine, based on how closely out-of-sample features resemble a data set, how to classify any given data point. A system utilizing the Near Miss 1 algorithm may use the kNN algorithm to shortlist k-nearest neighbors in the majority class for every data point in the minority class. Subsequently, the system executing the Near Miss 1 algorithm may calculate the average distance of these k-nearest neighbors from their respective minority class. The system may maintain only those data points from the majority class whose average distance is the smallest from the minority class. This may result in a sample number of data points of the majority class. In contrast to the Near Miss 1 algorithm, the Near Miss 2 algorithm may maintain those data points from the majority class whose distance to the k-farthest data points in the minority class is the lowest.

The Near Miss 3 algorithm may include additional operations compared to those of the Near Miss 1 and Near Miss 2 algorithms. For instance, using the kNN algorithm, a system executing the Near Miss 3 algorithm may shortlist the k-nearest neighbors in the majority class for every data point in the minority class. This results in a new majority class. The system subsequently selects only those data points from the new majority class whose average distance is largest from the minority class, resulting in yet another new majority class.

The cluster centroid algorithm relies on the k-Means algorithm to perform under-sampling of the data set 106. The k-Means algorithm may be used to store k centroids, which may be used to define a set of clusters. A data point is within a particular cluster if the data point is closer the centroid of that cluster than any other centroid. A system executing the cluster centroid algorithm may utilize the k-Means algorithm to cluster the data points comprising the majority class into an N number of clusters. The system may determine the centroid of each of the N clusters and the data points of these clusters are replaced by the N number of cluster centroids. These cluster centroids may be defined as the new majority class for the data set 106.

The RENN algorithm relies on first using the Edited Nearest Neighbors (ENN) algorithm. In the ENN algorithm, a system may chose a value of k and perform the kNN algorithm on all data points of the data set 106. The system may identify all data points of the majority class whose k-nearest neighbors are not from the majority class. The system may remove these data points from the majority class. To perform the RENN algorithm, the system may continue using the ENN algorithm until no further data points from the majority class can be removed from the updated data set.

The CNN algorithm uses a 1-nearest neighbor rule to iteratively determine if a data point should be removed or not. The purpose of the CNN algorithm is to select a subset of the data set 106 such that for every data point, its nearest neighbor in the subset is of the same class. To perform the CNN algorithm, a system may obtain all data points of the minority class in a set C. The system may add a data point from the majority class in set C and all other data points of the majority class in a set S. The system may evaluate each data point in set S and classify each of these data points using a 1-nearest neighbor rule. If a data point is misclassified, the data point is added to set C. This process may be repeated on set S until there are no data points to be added.

For the OSS algorithm, a pair of data points form a Tomek link if these data points belong to different classes and are each other's nearest neighbors. A system performing the OSS algorithm may identify the Tomek links using a kNN algorithm. The system may remove these Tomek links which are from the majority class. Further, the system may apply the 1-nearest neighbor rule to all data points and any that are misclassified are added to the set C. No iteration on the set S is performed. The C and S sets may be similar to those described above in connection with the CNN algorithm.

The instance hardness threshold algorithm is a particular algorithm in which a classifier is trained on the data set 106 and data points with lower probabilities are removed. Thus, the instance hardness threshold algorithm may remove the noise from an imbalanced data set. The instance hardness threshold algorithm may be used to find several data points from the data set 106 for which it is harder to predict the class label correctly than others and remove these from the training data set. This may result in better performance for the classification algorithms that may be trained using these training data sets. To perform this algorithm, a system may identify, from the data set 106, the data points of the majority class that may be difficult to classify. The system may subsequently use a logistic regression algorithm or any scikit-learn classifier to obtain the probability for each data point. The system may remove all majority class data points which may have a probability below a threshold value.

A system using an NCR algorithm may modify the ENN method described above by increasing the role of data cleaning. The system may remove negative data points which are misclassified by their 3-nearest neighbors. Further, the neighbors of each positive data points are found and the ones belonging to the majority class are removed. Similar to the OSS method described above, all data points in the class of interest C are saved, while the rest O of the original data T is reduced. Thus, to perform the NCR algorithm, the system may split the data set T into the class of interest C and the rest of the data points O. The system may then identify noisy data points A1 on O with the ENN method described above. For each class Ci in O, if ($x \in Ci$ in the 3-nearest neighbors of misclassified $y \in C$) and ($|Ci| \geq 0.5 * |C|$) then $A2 = \{x\} \cup A2$. The reduced data, S, is thus equal to $T - (A1 \cup A2)$.

In addition to the aforementioned under-sampling techniques, the data processing system 102 may select one or more over-sampling techniques for generating a training data set for the one or more classification algorithms that are to be evaluated. For instance, in a random over-sampling algorithm, the classification modeling system 104 may randomly over-sample the minority class of the data set 106 with replacements. To perform the random over-sampling algorithm, the classification modeling system 104 may determine a ratio, which may determine how many minority class data points will be present in the training data set after over-sampling. Based on this ratio, the classification modeling system 104 may add new minority data points to the training data set by randomly selecting minority class data points from the data set 106 that were already present in the minority class.

Through the SMOTE algorithm, the system may generate synthetic samples of the minority class to overcome the issue of data imbalance. For instance, to perform the SMOTE algorithm, the system may identify a data point from the data set 106 and consider its k-nearest neighbors. The system may take the vector between one of the k-nearest neighbors and the current data point. This vector may be multiplied by a random number x, where x is a value between 0 and 1. The system may add this to the feature vector under consideration.

The SMOTE algorithm may provide additional options to generate data points. These options may focus on data points near the border of the optimal decision function and may generate data points in the opposite direction of the nearest neighbor's class. The SMOTE algorithm may classify each data sample of the minority class into different categories: noise (e.g., all nearest-neighbors are from a different class than the minority class), danger (at least half of the nearest neighbors are from the minority class), and safe (all nearest neighbors are from the minority class). In a Borderline1 variant of SMOTE, the nearest neighbor should be the same as the minority class. In a Borderline2 variant of SMOTE, the nearest neighbor can be from either the majority or minority class. In a support-vector machine (SVM) variant of SMOTE, an SVM classifier is used to find support vectors and generate data points considering these vectors. This may focus on generate new minority class instances near borderlines with SVM to help establish boundary between classes.

The classification modeling system 104 may also provide a variant to SMOTE (e.g., SMOTE Nominal Continuous (SMOTE-NC)) that may be used to process data sets of continuous and nominal features. Using this algorithm, the system may compute the median of standard deviations of all continuous features for the minority class. If the nominal features differ between a sample and its potential nearest neighbors, then this median is included in the Euclidean distance computation. Further, the system may compute the Euclidean distance between the feature vector for which k-nearest neighbors are being identified (minority class data point) and the other feature vectors (minority class data points) using the continuous feature space. For every differing nominal feature between the considered feature vector and its potential nearest-neighbor, include the median of the standard deviations previously computed, in the Euclidean distance computation. The continuous features of the new synthetic minority class data point are created using the same approach of SMOTE as described above. The nominal feature is given the value occurring in the majority of the k-nearest neighbors.

The ADASYN algorithm may result in the use of a weighted distribution for different minority class data points according to their level of difficulty in learning, where more synthetic data is generated for minority class data points that are harder to learn compared to those minority data points that are easier to learn. To perform the ADASYN algorithm, the system may find the k-nearest neighbor for each data point in the minority class based on the Euclidean distance in n-dimensional space. The system may evaluate the ratio for each data point of the minority class. This ratio may be defined as $r = \Delta/k$, where $\Delta$ is the number of majority class data points in k-nearest neighbors of a minority data point. The system may identify the minority classes which have more majority class data points in their nearest neighbors using the ratio. For these minority classes, the system may apply the SMOTE algorithm described above to generate new synthetic minority class data points.

In an embodiment, the classification modeling system 104 also provides, in addition to the under-sampling and over-sampling algorithms described above, one or more ensemble algorithms for generating a training data set for the classification algorithms. For instance, the system may provide a balance cascade algorithm, which may generate a first learner on a sampled subset that includes a subset of the majority class and the entirety of the minority class. A new sampled subset from the majority class is filtered by the first learner such that the correct data points are removed. With this refined majority class subset and the minority data set, a new ensemble learner is generated. Iteratively, more learners are generated on filtered sampling data sets. These learners are then combined. Another ensemble algorithm (e.g., Easy Ensemble) may be used to sample several subsets from the majority class and train a learner using each of these subsets. The outputs of these learners are combined and ensemble sets are created by iteratively applying random under-sampling, as described above. The Easy Ensemble algorithm may be used to iteratively select a random subset and generate an ensemble of the different sets.

The SMOTE algorithm may be combined with other algorithms to generate the testing data set. For instance, the SMOTE algorithm may be used in conjunction with Tomek links to remove unwanted overlap between classes, whereby majority class links are removed until all minimally distanced nearest neighbor pairs are of the same class. Thus, if two instances form a Tomek link, then either one of these instances is noise or both are near a border. Tomek links are introduced to the over-sampled training data set as a data cleaning method. Thus, instead of removing only the majority class examples that form Tomek links, examples from both classes are removed. The SMOTE algorithm may also be combined with the ENN algorithm, which is used to remove data points from both classes.

The data processing system 102 may also select one or more classification algorithms from a set of classification algorithms 112 that may be used in conjunction with any of the aforementioned sampling algorithms to generate a classification model that may be evaluated subject to the one or more criteria specified in the request. For instance, the classification modeling system 104 may maintain a logistic regression algorithm, random forest models, Naïve Bayes models, linear regression models, decision tree models, K-Means clustering models, k-Nearest Neighbors (kNN) models, SVM models, gradient boosting machine models, and the like.

In an embodiment, the classification modeling system 104 provides, to the data processing system 102, an option to use a simple likelihood classification (SLC) algorithm that may be used for the classification of imbalanced data (e.g., data set 106). The SLC algorithm may return a score, for a given input point, ranging between 0 and 1. Using this score, and thresholds defined by the data processing system 102 or other entity, the SLC algorithm may determine how to classify an input point. The score may be interpreted as the probability that the input point belongs to a particular class, whereby the closer the score is to a value corresponding to the class, the more likely that that the input point belongs to that class. The SLC algorithm is implemented to process imbalanced data, whereby few data points for a particular class may be available within the data set.

The SLC algorithm uses the following to determine the class $\hat{y}(x)$ of x:

$$\rho(x) := \frac{p(X = x | Y = 1)}{p(X = x | Y = 0)} \quad \text{(Eq. 1)}$$

where $\rho(x)$ denotes a ratio of the posterior probability of Y=1 (e.g., first classification) given X=x to the posterior probability of Y=0 (e.g., second classification) given X=x. The SLC algorithm, given an input point x, returns a score $\sigma(x)$ between 0 and 1. This score may be interpreted as the probability that x belongs to a first class (e.g., the closer $\sigma(x)$ is to 1, the more likely it is that y(x)=1). Thus, the SLC algorithm returns the score $\sigma(x)$ rather than the classifier $\hat{y}$ itself.

By way of illustration, suppose that both $p(X=x|Y=0)\sim\mathcal{N}(-\mu,1)$ and $p(X=x|Y=1)\sim\mathcal{N}(\mu,1)$ are normally distributed within means $\pm\mu$, and that data $\{(x_1,0), \ldots, (x_n,0)\}$ in class 0 and $\{(x'_1,1), \ldots, (x'_n,1)\}$ in class 1, sampled according to said distributions. From this example, the SLC algorithm starts with a distribution and determines how the data may be sampled from the distribution. However, since the SLC algorithm may only have access to a finite data set, the SLC algorithm may attempt to recover the underlying distribution from the data. Further, the SLC algorithm may construct an approximation $\tilde{p}$ for the true distribution p, which enables construction of a classifier $\hat{y}:X\rightarrow Y$ using the ratio:

$$\tilde{\rho}(x) := \frac{\tilde{p}(X = x | Y = 1)}{\tilde{p}(X = x | Y = 0)} \quad \text{(Eq. 2)}$$

as follows:

$$\hat{y}(x) = \begin{cases} 1 & \text{if } \tilde{\rho}(x) \geq \eta \\ 0 & \text{else} \end{cases} \quad \text{(Eq. 3)}$$

for some constant threshold $\eta$. For instance, if $\eta=1$, the input space may be separated at x=0 such that data points x<0 would be classified as $\hat{y}$ (x)=0 and all other data would receive classification $\hat{y}$ (x)=1.

As noted above, the SLC algorithm does not provide the classifier $\hat{y}$ (x) itself, but rather a score $\sigma(x)$. The score $\sigma(x)$ may be calculated using the sigmoidal function s(z) whole limit is 1 as $z\rightarrow\infty$ and whole limit is 0 as $z\rightarrow-\infty$, as demonstrated in Eq. 4 below:

$$s(z) := \frac{1}{1 + e^{-z}} \quad \text{(Eq. 4)}$$

Thus, s may be read as a probability or probability approximation. The SLC algorithm may take the logarithm of the ratio $\tilde{\rho}(x)$ and apply the sigmoidal s, resulting in the following score function:

$$\sigma(x) := s(\log\tilde{\rho}(x)) \quad \text{(Eq. 5)}$$

where:

$$s(\log\tilde{\rho}(x)) = \frac{1}{1 + \frac{1}{\tilde{\rho}(x)}} \quad \text{(Eq. 6)}$$

The score $\sigma(x)$ may be interpreted to be the probability that x belongs to class 1. Thus, the output of the SLC algorithm is a score according to which, by defining a threshold, a user can build a classification function. For instance, a user can build a classification function as below.

$$\hat{y}_\eta(x)i = \mathbb{1}_{\sigma\geq\eta}(x) = \begin{cases} 1 & \text{if } \sigma(x) \geq \eta \\ 0 & \text{else} \end{cases} \quad \text{(Eq. 7)}$$

To further build the scoring function σ(x) for the SLC algorithm, an estimation of density is utilized. For instance, given feature data $x \in \chi \subseteq \mathbb{R}^d$, an estimation of the likelihood p(X=x|Y=y) is to be obtained. Given data $\mathcal{S}$, the normalized histogram function is denoted as $h:\mathbb{R}^d \rightarrow \mathbb{R}^{\geq 0}$. To mitigate the lack of robustness inherent in histograms, the density may be estimated using kernel density estimation in order to incorporate each data point. Through kernel density estimation (KDE), a smooth kernel function is placed above each data point d. For example, if the kernel is Gaussian, then a normal density $$\frac{1}{\sqrt{2\pi}}e^{-(x-\mu_d)^2/2}$$

with mean $\mu_d$ (the value of data point d) is placed above data entry d. The density approximation is given as the normalized sum of these kernels:

$$p_{kde}(x) = \frac{1}{n \cdot h}\sum_{j=1}^{n} k\left(\frac{x-\mu_j}{h}\right) \quad \text{(Eq. 8)}$$

where h is a smoothing parameter, or bandwidth, and k denotes the kernel. Different kernels may be used for density estimation, such as uniform, triangular, biweight, triweight, Gaussian, Epanechnikov, normal, and the like.

Assuming conditional independence, KDE may be used in order to obtain $$\tilde{p}_i^j(x),$$

an approximation of the univariate likelihood p(X(i)=x(i) |Y=j). For instance, KDE may be first used to separately estimate the density from univariate data corresponding to each class. Further, the estimated density may be evaluated on some uniform set of values in the domain of the univariate feature space. A ridge regression may be used to fit the difference of logarithms on these evaluated densities and the output of regression may be used to define the scoring function σ(x).

To perform the classification of data points of a data set $\mathcal{S}_i=\{x_i(i), \ldots, x_m(i)\}$ for a feature i, the data set is split into two data sets $$\mathcal{S}_i^0 \text{ and } \mathcal{S}_i^1$$

of class 0 and class 1, respectively. On each data set $$\mathcal{S}_i^j,$$

a KDE fit is applied to obtain a density estimation $$\kappa_i^j$$

of the given data. This fit may serve as an attribute of a density estimation object. Following this operation, the one-dimension domain of the feature space for X(i) is discretized into n points and an evaluation of the fitted density $$\kappa_i^j$$

is performed at each data point $t_l$ to obtain $$\{\kappa_i^0(t_1), \ldots, \kappa_i^0(t_n)\}$$

and $$\{\kappa_i^1(t_1), \ldots, \kappa_i^1(t_n)\}.$$

This approximation may allow for the comparison of the two distributions at the same points (values).

The SLC algorithm may subsequently take the difference log $$\log(\kappa_i^1(t_l)) - \log(\kappa_i^0(t_l))$$

(or the logarithm of the ratios log $$\log(k_i^1 / k_i^0))$$

and apply a ridge regression to estimate the relationshipt, $$f_i(x) \approx \log(\kappa_i^1(x)) - \log(\kappa_i^0(x))$$

between x and the difference of logarithms. The difference of algorithms may be reasonably shaped such that, after regression, an exponential may be applied to recover an estimate of the ratio of likelihoods as demonstrated in Eq. 9:

$$\frac{1}{r_i(x)} := e^{(f_i(x))} \approx \frac{p_1(x(i))}{p_0(x(i))} \quad \text{(Eq. 9)}$$

Kernel ridge regression may be used to prevent overfitting, whereby the kernel trick may be used to learn nonlinearity structure in data by computationally feasible techniques. Finally, given an arbitrary input data $x \in \mathbb{R}^d$, the SLC algorithm may compute the score σ(x):

$$\sigma(x) := \frac{1}{1 + \prod_{i=1}^{d} r_i(x)} \quad \text{(Eq. 10)}$$

Thus, training of the SLC algorithm may comprise density estimation on each class feature data, regression to functionally approximate the ratio (e.g., the difference of logarithms), and performing predictions to obtain a scoring function that may be evaluated on any new input data.

In an embodiment, the SLC algorithm can be refined using feature importance. For instance, the SLC algorithm may split a data set $\mathcal{S}_i$ into two data sets $$\mathcal{S}_i^0 \text{ and } \mathcal{S}_i^1$$

of class 0 and class 1, respectively, and apply a KDE fit on each data set $$\mathcal{S}_i^j$$

to obtain a density estimation $$\kappa_i^j$$

of the given data, as described above. During the training phase, the ratio $p_1/p_0$ is calculated for each feature of the training data set. The average of the absolute values of the aforementioned ratio for a given feature, $F_i$, is used the metric of feature importance, which may be calculated using Eq. 11 below:

$$F_i := \frac{1}{n}\sum_{j=1}^{n}\left|\frac{1}{r_i(x_j)}\right| \quad \text{(Eq. 11)}$$

The resulting $F_i$ may be ordered from high to low, and the top k features may be selected, where k denotes a user defined parameter. For instance, for a model with a particular number of independent features, these features may be ranked based on their $F_i$ values, from high to low. The user may select the m top features, or set k=m. The data set $\tilde{\mathcal{S}} := \{\tilde{x}_1, \ldots, \tilde{x}_m\}$ with each $\tilde{x}_i \in \mathbb{R}^k$ whose components correspond to the most significant features is reformatted.

The multivariate form of the SLC algorithm may be trained on the data set $\tilde{\mathcal{S}}$. For instance, on each data set $\mathcal{S}^j$ resulting from the split of the data set $\mathcal{S}$ into the two data sets $$\mathcal{S}_i^0$$

and $$\mathcal{S}_i^1$$

of class 0 and class 1, respectively, a multivariate KDE fit may be applied to obtain a density estimation $\kappa^j$ of the given data for j=0, 1. Further, the difference $$\log(\kappa_i^1(t_i)) - \log(\kappa_i^0(t_i))$$

(or the logarithm of the ratios $$\log(k_i^1/k_i^0))$$

of the predicted likelihoods $k^1(t)$ and $k^0(t)$ for future input data $t \in \mathbb{R}^d$ may be obtained. The score $\sigma(x)$ may be computed using Eq. 5 described above. Through the multivariate form of the SLC algorithm, a single multivariate density may be estimated as opposed to multiple separate univariate density estimations. Thus, ridge regression may not need to be performed for this multivariate form of the SLC algorithm.

In an embodiment, the request can specify the metrics or parameters that are to be obtained via processing of the data set 106 using the different classification models selected by the data processing system 102. For instance, the data processing system 102 may indicate, in its request, that the output to the request is to include, for each classification model, a precision-recall average value, a Kolmogorov-Smirnov (K-S) average value, a receiver operating characteristic (ROC) area under curve (AUC) value, a precision-recall AUC value, an accuracy value, a value corresponding to the product of the precision-recall average value and the K-S average value, and the like. Additionally, the requestor may define, in the request, graphic options for density and summary plots. These graphic options may be used by the classification modeling system 104 to generate a set of graphs or other charts illustrating the output generated using the different classification models.

In response to the request, the classification modeling system 104 may process the data set 106 using each possible combination of classification algorithm and sampling algorithm from those selected by the data processing system 102 in the request. Based on the set of criteria defined by the data processing system 102, the classification modeling system 104 may generate a set of density and summary graphs or other charts to illustrate the output generated using these different classification models (e.g., algorithm combinations). For instance, the classification modeling system 104 may generate a graph comparing the performance of different algorithm combinations for each of the metrics specified by the data processing system 102 in its request.

In an embodiment, the classification modeling system 104 implements additional metrics that provides greater sensitivity in illustrating the changes between different algorithm combinations. For example, the classification modeling system 104 can use a new metric (e.g., K-S value*average $25^{th}$ percentile minority scores) to capture these changes in the graphs or other charts to be provided in response to the request. This may include ordering the minority samples from high to low score and taking the average score of the top quartile. This is multiplied by the K-S value to obtain this new metric. Similarly, another new metric (e.g., precision-recall AUC value*average $25^{th}$ percentile minority scores) may also be used in conjunction with the new K-S average value (e.g., K-S value*average $25^{th}$ percentile minority scores) to generate a parameter that may be used to evaluate the different algorithm combinations.

In an embodiment, the data processing system 102 can request that the classification modeling system 104 is to provide a classification model 108 that best satisfies the set of criteria to the data processing system 102. For instance, if the data processing system 102 specifies, in the request, that it wants to obtain a classification model 108 that produces the best results for one or more metrics, the classification modeling system 104 may evaluate the performance of each of the algorithm combinations to determine which combination produces the best results for the specified one or more metrics. Thus, in addition to the various charts and tables demonstrating the performance of each of the different algorithm combinations, the classification modeling system 104 may provide the classification model 108 that had the best performance for the one or more metrics specified by the data processing system 102 in its request.

In an embodiment, the data processing system 102 can alternatively submit a request to generate a particular classification model 108 using a specific combination of classification and sampling algorithms and that satisfies the set of criteria. In response to the request, the classification modeling system 104 may process the data set 106 using the selected classification model. In an embodiment, the classification modeling system 104 uses a logistic regression model to generate, for each data point, a probability that the data point has a particular classification. From this probability, the classification modeling system 104, via the classification model and a cutoff value, may classify each data point as being either corresponding to a majority classification (e.g., authentic transaction, etc.) or to a minority classification (e.g., fraudulent transaction, etc.). More generally, the classification model may be used to perform binary classification of the various data points from the data set. While logistic regression is used extensively throughout the present disclosure for the purpose of illustration, other models may be used in the classification of the various data points of the data set. Other models may include random forest models, Naïve Bayes models, linear regression models, decision tree models, K-Means clustering models, kNN models, SVM models, gradient boosting machine models, and the like. To address the potential of misclassification of imbalanced data, the classification model may be constructed with a sampling algorithm or model to perform re-sampling of the data set, as described above.

In an embodiment, the classification modeling system 104 provides an output summary and the classification model 108 to the data processing system 102 to fulfill the request. The output summary may include various metrics corresponding to the output generated using the classification model 108. These metrics may include, for the classification model 108, at least a precision-recall average value, a K-S average value, a ROC AUC value, a precision-recall AUC value, an accuracy value, a value corresponding to the product of the precision-recall average value and the K-S average value, and the like. Additionally, or alternatively, the classification modeling system 104 may provide a set of graphs or other charts illustrating the output generated using the classification model 108 and other combinations of sampling algorithms and classification algorithms evaluated by the classification modeling system 104.

In an embodiment, the classification modeling system 104 provides the classification model 108 in the form of an application or other executable instructions that can be implemented by the requestor to process other data sets using the classification model 108. This application or other executable instructions may be used to classify data points from a data set and perform any operations corresponding to this classification. For instance, for a particular data set, a user of the application or other executable instructions may identify any fraudulent transactions and perform any mitigating actions to address these fraudulent transactions.

Figure 2:
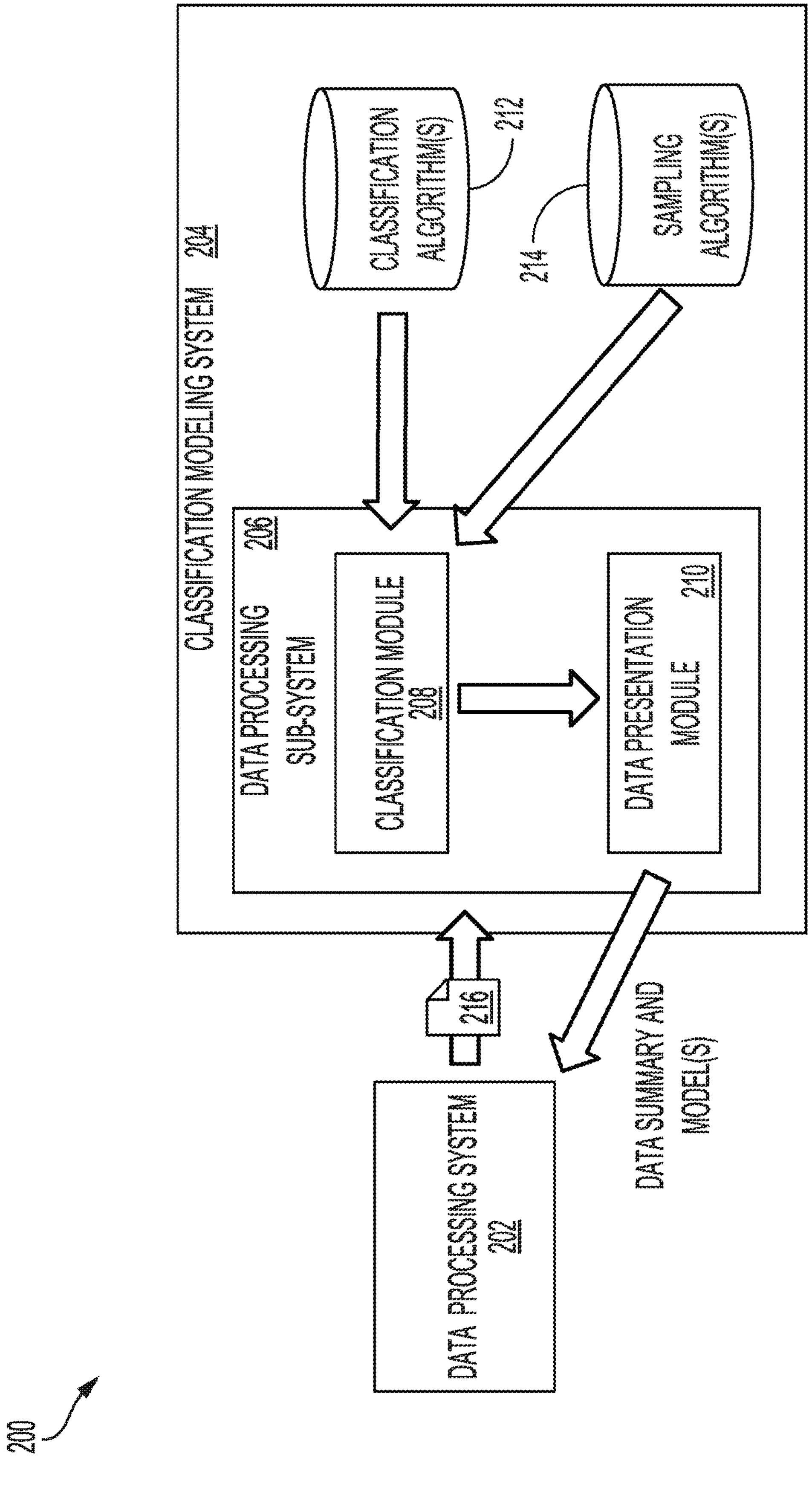
FIG. 2 shows an illustrative example of an environment in which a classification module of a classification modeling system utilizes different combinations of classification algorithms and sampling algorithms to derive a classification model that satisfies one or more criteria in accordance with at least one embodiment.

FIG. 2 shows an illustrative example of an environment 200 in which a classification module 208 of a classification modeling system 204 utilizes different combinations of classification algorithms and sampling algorithms to derive a classification model that satisfies one or more criteria in accordance with at least one embodiment. In the environment 200, a classification modeling system 204 obtains a request from a data processing system 202 to process a data set 216 using different classification algorithm and sampling algorithm combinations to identify a classification model that best classifies the data points included in the data set 216 according to one or more metrics defined in the request. For instance, the request may specify one or more criteria or metrics that may be used by the classification modeling system 204 to determine which of the classification models provides the best performance in accordance with the one or more criteria or metrics. For example, the data processing system 202 may indicate, in the request, that the classification modeling system 204 is to identify a classification model that provides the best metric value for one or more metrics compared to other classification models tested.

The request from the data processing system 202 may further specify one or more options for evaluation of the different algorithm combinations (e.g., classification models) using the data set 216 as input. For instance, the data processing system 202 may select the classification algorithms and/or sampling algorithms that are to be used by the classification modeling system 204 to identify one or more classification models that provide the best performance for the criteria or metrics set forth by the data processing system 202. Additionally, or alternatively, the data processing system 202 may specify, in the request, one or more metrics or parameters for which the classification modeling system 204 is to provide results for the various algorithm combinations. These metrics or parameters may include a precision-recall average value, a K-S average value, a ROC AUC value, a precision-recall AUC value, an accuracy value, a value corresponding to the product of the precision-recall average value and the K-S average value, and the like. Additionally, the data processing system 202 may define, in the request, graphic options for density and summary plots. These graphic options may be used by the classification modeling system 204 to generate a set of graphs or other charts illustrating the output generated using the different classification models.

In an embodiment, the classification modeling system 204 includes a data processing sub-system 206 that is configured to process incoming requests from the data processing system 202 or other entities to evaluate different classification models using a data set 216 provided in the incoming requests. The data set 216 may be pre-processed such that the actual classification of each of the data points is known and can be used to evaluate the performance of each of the classification models selected by the data processing system 202 in its request or selected, by default, by the classification modeling system 204 if the data processing system 202 does not provide a selection of sampling algorithms and/or classification algorithms from which classification models may be derived.

In response to the request, a classification module 208 of the data processing sub-system 206 obtains, from a classification algorithm repository 212, the one or more classification algorithms specified in the request or otherwise identified by the classification modeling system 204 as being required for evaluation. Similarly, the classification module 208 may obtain, from a sampling algorithm repository 214 the one or more sampling algorithms that are to be used in conjunction with the classification algorithms to process the data set 216.

The classification module 208 may process the data set 216 provided by the data processing system 202 by using the data set 216 as input to each of the different algorithm combinations in accordance with the selected options. For instance, the classification module 208 may identify a first classification algorithm and a first sampling algorithm. The classification module 208 may use these algorithms in combination and use the data set 216 as input to obtain a classification of the various data points of the data set 216 into either a majority data set (e.g., authentic transactions) or a minority data set (e.g., fraudulent transactions). The classification module 208 may process the data set 216 using each of the classification algorithm and sampling algorithm combinations to obtain different classifications of the data points in the data set 216. Further, the classification module 208 may evaluate these different classifications to generate the metrics or parameters resulting from the different classifications.

The data presentation module 210 may process the various metrics and other information generated by the classification module 208 via evaluation of the various classification algorithm and sampling algorithm combinations (e.g., classification models) to generate a summary detailing performance of each of these combinations. The data presentation module 210 may generate, based on the graphic options selected by the data processing system 202, one or more charts, graphs, and/or tables detailing the performance of each of the different classification models tested by the classification module 208 using the provided data set 216. These charts, graphs, and/or tables may provide graphical representations of the various metrics (e.g., precision-recall average value, a K-S average value, a ROC AUC value, a precision-recall AUC value, an accuracy value, a value corresponding to the product of the precision-recall average value and the K-S average value, etc.) for each of the classification models, as well as a detailed summary of each of these metrics. In an embodiment, the data presentation module 210 also highlights, within these charts, graphs, and/or tables, any classification models that satisfy the set of criteria defined by the data processing system 202.

In an embodiment, the data presentation module 210 provides the data summary (e.g., charts, graphs, tables, etc.) to the data processing system 202 to fulfill the request. Additionally, the data presentation module 210 may provide, to the data processing system 202, the one or more classification models that satisfy the set of criteria specified by the data processing system 202 in its request. Alternatively, the data presentation module 210 may provide the classification model that provides the best performance for the one or more criteria or metrics defined by the data processing system 202 in its request. The data processing system 202 may use any of these one or more classification models to processing additional data sets to classify its data points into either a majority class (e.g., authentic transactions) or a minority class (e.g., fraudulent transactions). In some instances, the data processing system 202 can submit a new request, with new data sets, to the classification modeling system 204 to further evaluate performance of the one or more classification models that satisfied the one or more criteria specified by the data processing system 202 in the previous request. This can provide further refinement of the analysis of the one or more classification models and allow the data processing system 202 to determine which of these one or more classification models provides the best performance.

Figure 3:
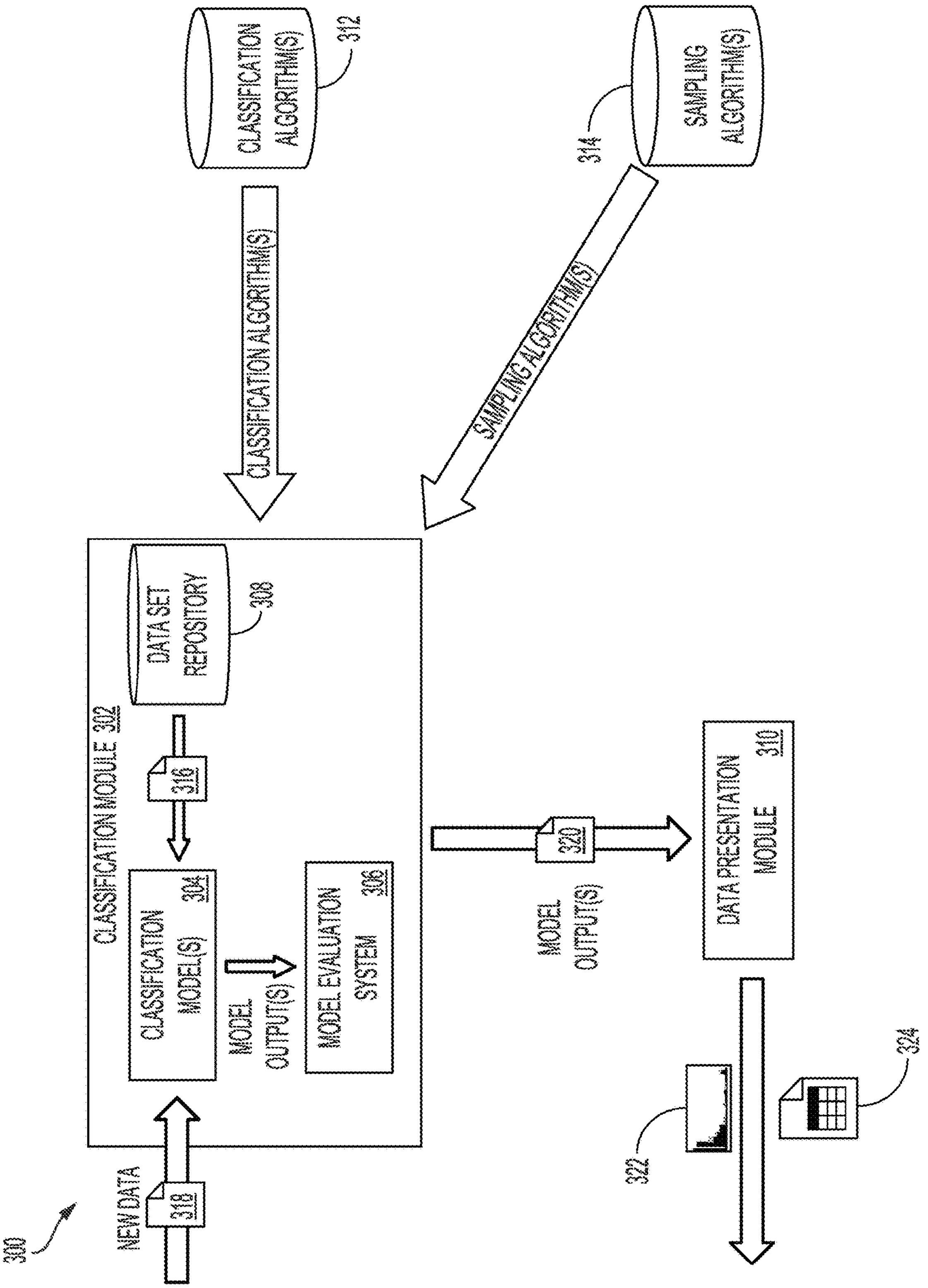
FIG. 3 shows an illustrative example of an environment in which a classification module of a classification modeling system selects a classification model based on an evaluation of output of different classification models in accordance with at least one embodiment.

FIG. 3 shows an illustrative example of an environment 300 in which a classification module 302 of a classification modeling system selects a classification model based on an evaluation of output of different classification models in accordance with at least one embodiment. In an embodiment, the classification modeling system obtains a request to provide a classification model that provides the best performance for a set of criteria or metrics defined in the request. For instance, the request may specify that a classification model is to be provided that provides the best results for a given parameter (e.g., a precision-recall average value, a K-S average value, a ROC AUC value, a precision-recall AUC value, an accuracy value, a value corresponding to the product of the precision-recall average value and the K-S average value, etc.). Further, the request specify one or more classification algorithms and one or more sampling algorithms that may be used to generate different classification models to be evaluated subject to the one or more criteria or metrics specified in the request. The request may include an initial data set that may be processed using the different classification models to identify which classification model provides the best results for a given parameter, as defined in the request. In some instances, the request may further specify one or more graphic options, which may be used to generate one or more summary plots as detailed herein.

In an embodiment, the classification module 302 obtains, in response to the request, one or more classification algorithms from a classification algorithm data store 312 and one or more sampling algorithms from a sampling algorithm data store 314 to create a set of classification models 304 that may be used to process a data set and classify the data points of the data set. The classification module 302 may process the data set provided by the requestor or otherwise obtained by the classification modeling system by using the data set as input to the one or more classification models 304. The output of these one or more classification models 304 may include, for each classification model, a classification of the various data points of the data set into either a majority data set or a minority data set. This output may be provided to a model evaluation system 306 of the classification module 302 to determine which classification model of the one or more classification models 304 provides the best results according to the set of criteria or metrics defined in the request. For instance, if the one or more criteria or metrics specify that a classification model is to be selected that provides the best precision-recall average value, the model evaluation system 306 may calculate the precision-recall average value for each classification model and determine which classification model provides the best precision-recall average value.

In an embodiment, the model evaluation system 306 provides the model output 320 for each of the classification models 304, as well as the classification model that provides the best result for the one or more criteria or metrics defined in the request, to the data presentation module 310. The data presentation module 310 may process the various metrics and other information generated by the classification module 302 via the model evaluation system 306 to generate a summary detailing performance of the classification model provided by the model evaluation system 306, as well as the performance of the other one or more classification models 304 evaluated by the model evaluation system 306. The data presentation module 310 may generate, based on the graphic options selected by the requestor, one or more charts, graphs, and/or tables detailing the performance of the classification models 304 using the provided data set, as well as any other data sets used by the classification module 302. These charts, graphs, and/or tables may provide graphical representations of the various metrics (e.g., precision-recall average value, a K-S average value, a ROC AUC value, a precision-recall AUC value, an accuracy value, a value corresponding to the product of the precision-recall average value and the K-S average value, etc.) for the classification models 304, as well as a detailed summary of each of these metrics.

In an embodiment, the data presentation module 310 provides at least one or more data distribution charts 322 and one or more performance tables 324 to the requestor to fulfill the request. Additionally, the data presentation module 310 may provide, to the requestor, the version of the classification model 304 that provided the best results for the one or more criteria or metrics specified in the request. In some instances, the requestor can submit a new request, with new data sets, to the classification modeling system to further evaluate performance of the provided classification model and of other classification models to determine whether the provided classification model still provides the best results for the set of criteria or metrics defined by the requestor. The classification module 302 may utilize the previously processed data sets 316 from a data set repository 308 (including the initial data set provided in the original request) and any new data sets 318 obtained from the requestor or other sources as input to the one or more classification models 304 to generate a new output for each of the one or more classification models 304. The model evaluation system 306 may evaluate the new output to determine whether a different classification model provides the best results corresponding to the one or more criteria or metrics defined in the request. If a different classification model is identified as providing better results for the one or more criteria or metrics compared to the previously provided classification model, the different classification model may be provided to the requestor, as well as new data distribution charts 322 and performance tables 324 illustrating the new metrics for the various classification models 304 evaluated by the model evaluation system 306.

Figure 4:
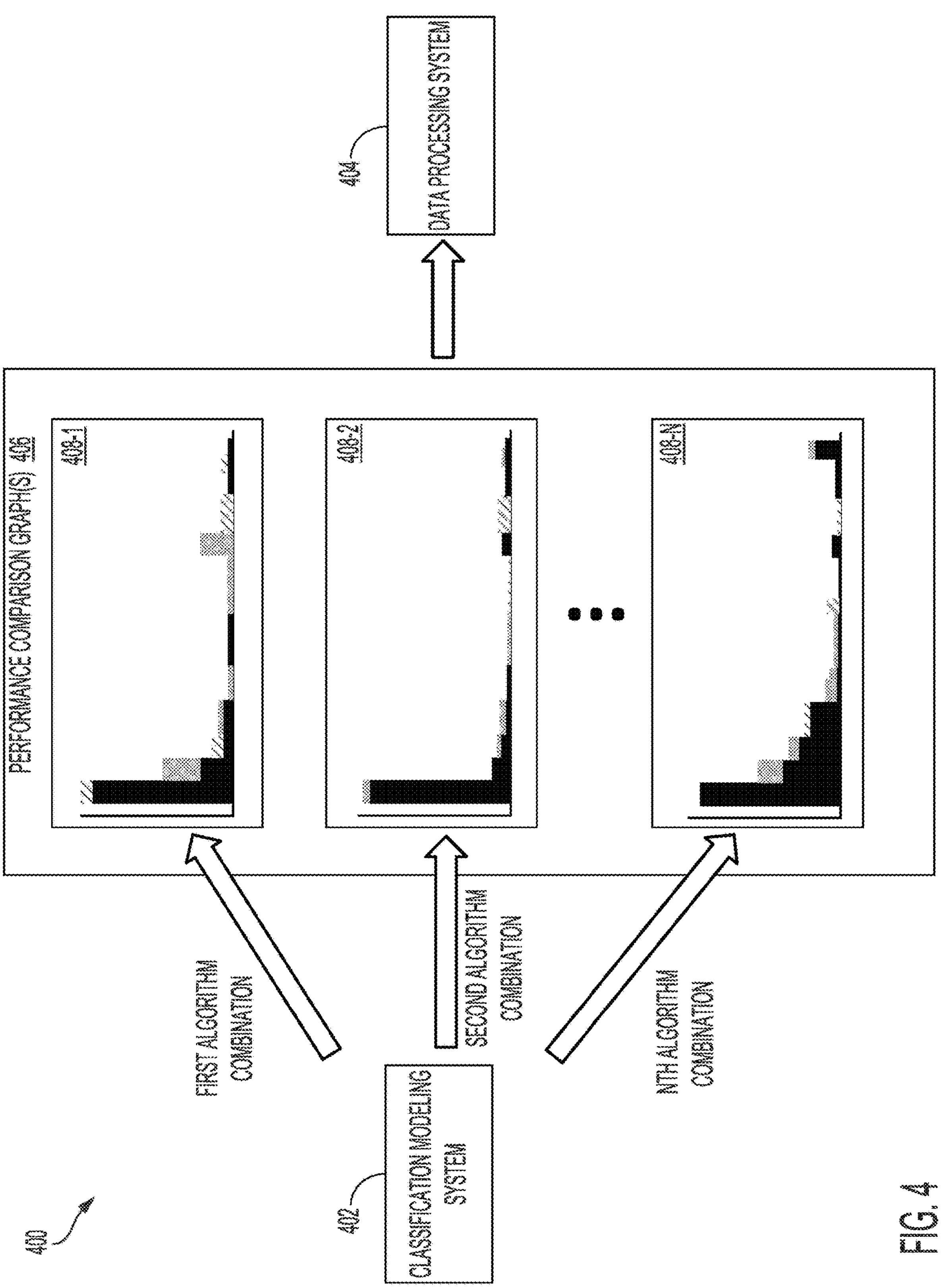
FIG. 4 shows an illustrative example of an environment in which a classification modeling system generates a set of performance comparison graphs highlighting the distribution of majority data and minority data from an obtained data set for different classification models in accordance with at least one embodiment.

FIG. 4 shows an illustrative example of an environment 400 in which a classification modeling system 402 generates a set of performance comparison graphs 406 highlighting the distribution of majority data and minority data from an obtained data set in accordance with at least one embodiment. As noted above, the classification modeling system 402, via a data presentation module, may generate a data summary that includes the performance metrics and parameters for the various classification models tested by the classification modeling system 402 using a data set provided by a data processing system 404 or other entity. In an embodiment, the classification modeling system 402 generates a set of performance comparison graphs 406 that illustrate the distribution of majority data and minority data for each of the algorithm combinations (e.g., classification models) used by the classification modeling system 402. For instance, the set of performance comparison graphs 406 may include, for each algorithm combination (e.g., classification model), a chart 408-1-408-N illustrating the distribution of majority data and minority data.

The classification modeling system 402 may provide these performance comparison graphs 406 to the data processing system 404 to fulfill the request of the data processing system 404. This allows the data processing system 404 to have a graphical representation of the classification of the various data points into majority data and minority data for each of the algorithm combinations selected by the data processing system 404. Thus, the data processing system 404 may readily evaluate, based on the performance comparison graphs 406 this measure of performance for each of the algorithm combinations.

FIG. 5 shows an illustrative example of an environment 500 in which a classification modeling system 502 generates a performance comparison table 506 that specifies various output metrics for different machine learning algorithm and sampling algorithm combinations (e.g., classification models) in accordance with at least one embodiment. In the environment 500, the classification modeling system 502 generates, based on evaluation of the various algorithm combinations selected by the data processing system 504, a performance comparison table 506 that provides a detailed summary of the various metrics and parameters for each of the various algorithm combinations resulting from classification of the data points of a data set.

The performance comparison table 506 may include a set of columns corresponding to the algorithm combinations utilized to process the provided data set and the various metrics and parameters resulting from the processing of the provided data set. For instance, the performance comparison table 506 may include a machine learning (e.g., classification) method column 508 and a sampling method column 510, which may correspond to the machine learning algorithm and sampling algorithm, respectively, used to process the data set. The performance comparison table 506 may also include a precision-recall average value column 512, a K-S average value column 514, a ROC AUC value column 516, a precision-recall AUC value column 518, an accuracy value column 520, and a precision-recall average and K-S average product value column 522. It should be noted that the performance comparison table 506 may be generated with additional and/or alternative columns corresponding to additional and/or alternative metrics. The columns provided in the performance comparison table 506 may correspond to the metrics and parameters requested by the data processing system 504 for each of the algorithm combinations (e.g., classification models) that are to be evaluated using a provided data set.

In an embodiment, the classification modeling system 502 can highlight any of the values specified in the performance comparison table 506 that represent the best performance for the corresponding metrics specified by the data processing system 504 in its request. For instance, if the data processing system 504 requests a classification model that provides the best performance for a particular metric or parameter, the classification modeling system 502 may indicate, via the performance comparison table 506, the value for the particular metric or parameter that represents the best performance from the set of classification models.

Figure 6:
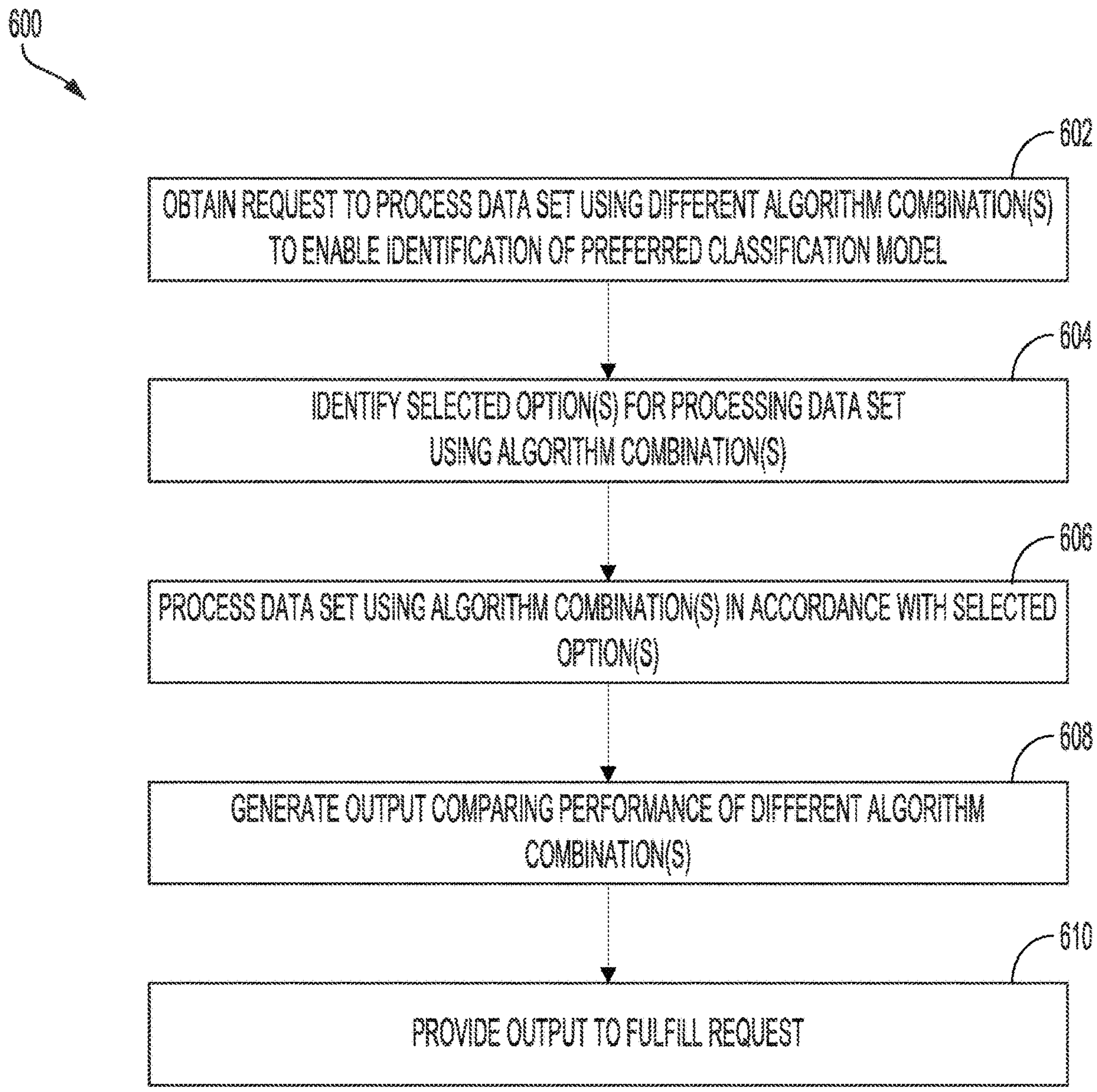
FIG. 6 shows an illustrative example of a process for processing a data set using different machine learning and sampling algorithm combinations in accordance with a set of user-defined options to provide a comparison among these combinations subject to the set of user-defined options in accordance with at least one embodiment.

FIG. 6 shows an illustrative example of a process 600 for processing a data set using different classification algorithm and sampling algorithm combinations in accordance with a set of user-defined options to provide a comparison among these combinations subject to the set of user-defined options in accordance with at least one embodiment. The process 600 may be performed by a classification modeling system or other system configured to process incoming data sets using different combinations (e.g., classification models) of classification algorithms and sampling algorithms to generate an output comparing the performance of the different combinations in classifying the data points of the processed data sets.

In an embodiment, the classification modeling system obtains, at step 602, a request to process a data set using different combinations of classification algorithms and sampling algorithms to enable identification of a preferred classification model for the processing of the data set and other data sets. The request may include the data set or, alternatively, a location (e.g., network address, etc.) where the data set may be obtained. In some instances, the requestor may indicate, in the request, that the classification modeling system is to use a sample data set maintained by the classification modeling system for the training and evaluation of various classification models. If the request does not provide a data set for evaluation of the different classification models, the classification modeling system may use the sample data set described above or obtain a data set from a third party provider. This data set from a third party provider may also be used for training and evaluation of the various classification models.

In the request, the requestor may also select one or more classification algorithms and sampling algorithms that, in combination, may be evaluated to determine how these algorithms process the provided data set. In an embodiment, the classification modeling system provides, via an interface, a list of available classification algorithms and a list of available sampling algorithms that may be used to process the provided data. Through this interface, the requestor may select the one or more classification algorithms and the one or more sampling algorithms that may be used in tandem, as a classification model, to process the provided input data. Additionally, the requestor may define the different algorithm combinations (classification models) that are to be evaluated. For instance, the requestor may specify, via the interface or in the request, that a particular classification algorithm is to be used in conjunction with a particular set of sampling algorithms. This may cause the classification modeling system to generate classification models corresponding to combinations of the particular classification algorithm with each of the sampling algorithms of the particular set of sampling algorithms. If the requestor does not specify a particular combination of algorithms, the classification modeling system may generate the combinations based on the requestor selections.

The requestor may also select the metrics or parameters that are to be obtained via processing of the data set using the different classification models selected by the requestor. For instance, the requestor may indicate, in its request, that the output to the request is to include, for each classification model, a precision-recall average value, a Kolmogorov-Smirnov (K-S) average value, a receiver operating characteristic (ROC) area under curve (AUC) value, a precision-recall AUC value, an accuracy value, a value corresponding to the product of the precision-recall average value and the K-S average value, and the like. Additionally, the requestor may define, in the request, graphic options for density and summary plots. These graphic options may be used by the classification modeling system to generate a set of graphs or other charts illustrating the output generated using the different classification models.

In some embodiments, the incoming data set includes imbalanced data, whereby a majority of the data points in the data set correspond to a first characteristic and a minority of the data points in the data set correspond to a second characteristic. For example, a data set may include a vast majority of data points that correspond to "authentic transactions" whereas a vast minority of data points correspond to "fraudulent transactions." It should be noted that the classification model is agnostic as to whether the incoming data set includes imbalanced data. For instance, for a logistic regression model, the classification modeling system may generate, for each data point, a probability that the data point has a particular classification. From this probability, the classification modeling system, via the classification model and a cutoff value, may classify each data point as being either corresponding to a majority classification or to a minority classification. More generally, the classification models generated via different combinations of classification algorithms and sampling algorithms may be used to perform binary classification of the various data points from the data set.

At step 604, the classification modeling system may identify the selection options for processing the data set using the different algorithm combinations (classification models). For instance, the classification modeling system may evaluate the request to identify the requestor selections described above. Alternatively, if the requestor has not provided any options for processing the data set using the different algorithm combinations, the classification modeling system may utilize a set of default options for processing the data set using these different algorithm combinations and for generating output comparing the performance of the various algorithm combinations used by the classification modeling system. For instance, by default, the classification modeling system may process the data set using each possible combination of classification algorithms and sampling algorithms maintained by the classification modeling system. Further, the classification modeling system may generate graphs and tables subject to a set of default graphic options if the requestor has not provided any graphic options.

At step 606, the classification modeling system may process the data set provided by the requestor or otherwise obtained by the classification modeling system by using the data set as input to each of the different algorithm combinations in accordance with the selected options. For instance, classification modeling system may identify a first algorithm combination (e.g., a first classification algorithm and a first sampling algorithm) and use the data set as input to obtain an output. This output may include a classification of the various data points of the data set into either a majority data set or a minority data set. The classification modeling system may process the data set using each of these algorithm combinations to obtain different classifications of the data set.

At step 608, the classification modeling system may generate output comparing the performance of the different algorithm combinations. For instance, based on the options selected by the requestor or otherwise identified by the classification modeling system (e.g., default options), the classification modeling system may generate values for each of a set of metrics corresponding to the performance of each algorithm combination. As noted above, these metrics may include, for each algorithm combination, at least a precision-recall average value, a K-S average value, a ROC AUC value, a precision-recall AUC value, an accuracy value, a value corresponding to the product of the precision-recall average value and the K-S average value, and the like. Additionally, or alternatively, based on the options specified by the requestor in its request or otherwise identified by the classification modeling system, the classification modeling system may generate a set of graphs or other charts illustrating the output generated using each of the different algorithm combinations.

The classification modeling system, at step 610, may provide the generated output to the requestor to fulfill the request. The output may include one or more graphs or charts comparing the performance of the different algorithm combinations using the metrics specified by the requestor or otherwise identified by the classification modeling system by default. Additionally, or alternatively, the classification modeling system may provide a corresponding data table or data structure that specifies, for each of the algorithm combinations, the metrics used to determine the performance the algorithm combination. This data table or data structure may include the values represented on the one or more graphs or charts generated by the classification modeling system. The classification modeling system may further provide the distribution of the majority data and minority data as a function of the algorithm combination score.

In an embodiment, the classification modeling system can also provide an application or executable instructions that can be used by the requestor to process future data sets using one or more algorithm combinations. For instance, the classification modeling system may identify, based on the selected options and the resulting values for the different metrics specified by the requestor, a particular algorithm combination (e.g., classification model) that provides the desired classification of the various data points in the data set. Using this particular classification model, the classification modeling system may generate an application or other executable instructions that may be implemented by the requestor to process future data sets for classification of the data points therein. In some instances, the classification modeling system provides a classification model that provides the desired classification of the data points of the provided data set based on the various options specified by the requestor in its request.

In an embodiment, in the request, the requestor can specify combinations of machine learning models and sampling models that can be used to generate a classification model that satisfies the set of criteria set forth by the requestor. For instance, via an interface provided by the classification modeling system, the requestor may choose, from a list of available classification algorithms, one or more classification algorithms that may be tested using the data set provided by the requestor or alternatively obtained by the classification modeling system from third parties or maintained as test data by the classification modeling system. Additionally, through the interface, the requestor may choose, from a list of available sampling algorithms, one or more sampling algorithms that may be used to generate the sample data to be used by the classification algorithms. The classification modeling system may test each of these combinations to generate a classification model that satisfies the set of criteria provided by the requestor.

Figure 7:
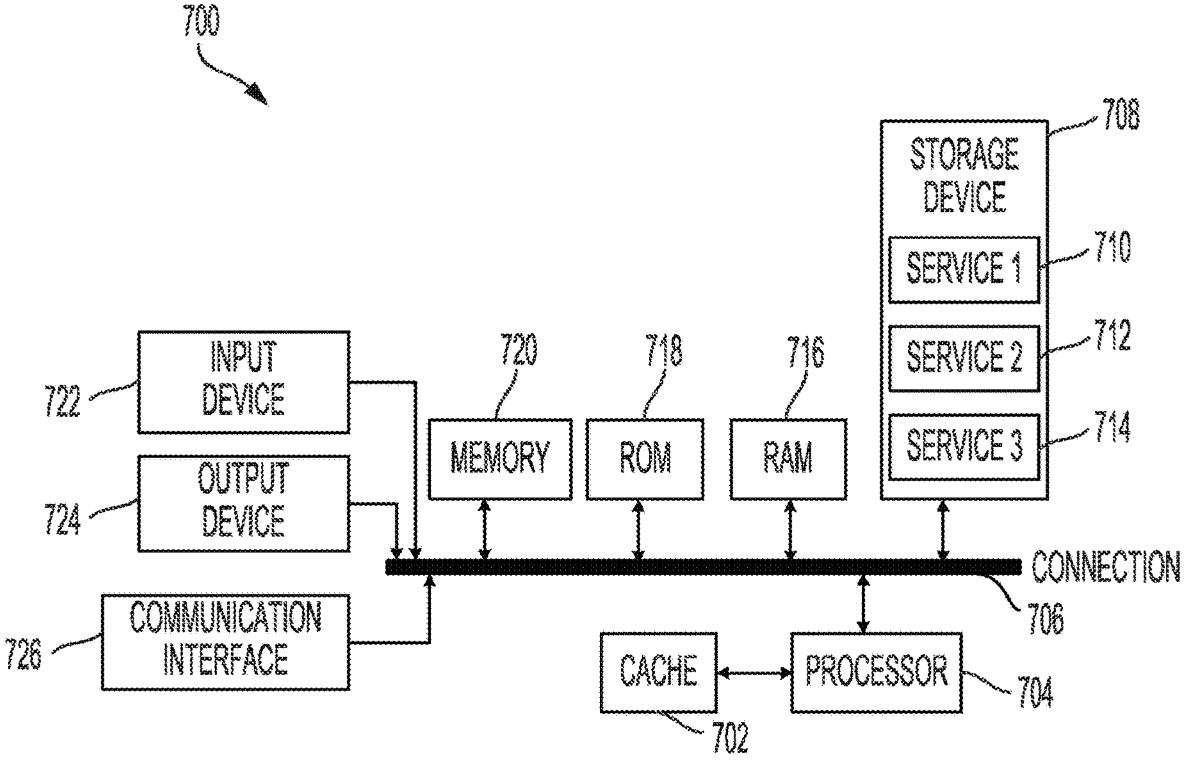
FIG. 7 shows a computing system architecture including various components in electrical communication with each other using a connection in accordance with various embodiments.

FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:

receiving a request to provide a classification model for processing and classifying different data sets;

obtaining a sample data set, wherein the sample data set includes first data associated with a first characteristic and second data associated with a second characteristic;

identifying a set of classification algorithms and a set of sampling algorithms;

generating different classification models for processing of the sample data set, wherein the different classification models are generated by combining different classification algorithms from the set of classification algorithms with different sampling algorithms from the set of sampling algorithms;

processing the sample data set through the different classification models to generate different sets of classifications;

evaluating the different classification models based on the different sets of classifications and according to a set of metrics for evaluating performance of the different classification models;

selecting the classification model, wherein the classification model is selected based on the set of metrics and the performance of the different classification models; and providing the classification model and a summary of the performance of the different classification models.

2. The computer-implemented method of claim 1, wherein the request specifies different combinations of classification algorithms and sampling algorithms for generation of the different classification models.

3. The computer-implemented method of claim 1, wherein the request defines a selection of the set of metrics for evaluating the performance of the different classification models.

4. The computer-implemented method of claim 1, wherein the summary includes a data structure, and wherein the data structure specifies values corresponding to the set of metrics and for individual classification models from the different classification models.

5. The computer-implemented method of claim 1, wherein providing the classification model includes:

generating an application that includes the classification model, wherein when the application is implemented, the application processes different data sets using the classification model to classify data points of the different data sets.

6. The computer-implemented method of claim 1, wherein the sample data set is maintained for training and evaluation of various classification models.

7. The computer-implemented method of claim 1, wherein the request indicates a type of data set to be used for evaluating the different classification models, and wherein the sample data set is obtained from a data repository according to the type.

8. A system, comprising:

one or more processors; and memory storing thereon instructions that, as a result of being executed by the one or more processors, cause the system to:

receive a request to provide a classification model for processing and classifying different data sets;

obtain a sample data set, wherein the sample data set includes first data associated with a first characteristic and second data associated with a second characteristic;

identify a set of classification algorithms and a set of sampling algorithms;

generate different classification models for processing of the sample data set, wherein the different classification models are generated by combining different classification algorithms from the set of classification algorithms with different sampling algorithms from the set of sampling algorithms;

process the sample data set through the different classification models to generate different sets of classifications;

evaluate the different classification models based on the different sets of classifications and according to a set of metrics for evaluating performance of the different classification models;

select the classification model, wherein the classification model is selected based on the set of metrics and the performance of the different classification models; and provide the classification model and a summary of the performance of the different classification models.

9. The system of claim 8, wherein the request specifies different combinations of classification algorithms and sampling algorithms for generation of the different classification models.

10. The system of claim 8, wherein the request defines a selection of the set of metrics for evaluating the performance of the different classification models.

11. The system of claim 8, wherein the summary includes a data structure, and wherein the data structure specifies values corresponding to the set of metrics and for individual classification models from the different classification models.

12. The system of claim 8, wherein the instructions that cause the system to provide the classification model further cause the system to:

generate an application that includes the classification model, wherein when the application is implemented, the application processes different data sets using the classification model to classify data points of the different data sets.

13. The system of claim 8, wherein the sample data set is maintained for training and evaluation of various classification models.

14. The system of claim 8, wherein the request indicates a type of data set to be used for evaluating the different classification models, and wherein the sample data set is obtained from a data repository according to the type.

15. A non-transitory, computer-readable storage medium storing thereon executable instructions that, as a result of being executed by one or more processors of a computer system, cause the computer system to:

receive a request to provide a classification model for processing and classifying different data sets;

obtain a sample data set, wherein the sample data set includes first data associated with a first characteristic and second data associated with a second characteristic;

identify a set of classification algorithms and a set of sampling algorithms;

generate different classification models for processing of the sample data set, wherein the different classification models are generated by combining different classification algorithms from the set of classification algorithms with different sampling algorithms from the set of sampling algorithms;

process the sample data set through the different classification models to generate different sets of classifications;

evaluate the different classification models based on the different sets of classifications and according to a set of metrics for evaluating performance of the different classification models;

select the classification model, wherein the classification model is selected based on the set of metrics and the performance of the different classification models; and provide the classification model and a summary of the performance of the different classification models.

16. The non-transitory, computer-readable storage medium of claim 15, wherein the request specifies different combinations of classification algorithms and sampling algorithms for generation of the different classification models.

17. The non-transitory, computer-readable storage medium of claim 15, wherein the request defines a selection of the set of metrics for evaluating the performance of the different classification models.

18. The non-transitory, computer-readable storage medium of claim 15, wherein the summary includes a data structure, and wherein the data structure specifies values corresponding to the set of metrics and for individual classification models from the different classification models.

19. The non-transitory, computer-readable storage medium of claim 15, wherein the executable instructions that cause the computer system to provide the classification model further cause the computer system to:

generate an application that includes the classification model, wherein when the application is implemented, the application processes different data sets using the classification model to classify data points of the different data sets.

20. The non-transitory, computer-readable storage medium of claim 15, wherein the sample data set is maintained for training and evaluation of various classification models.

21. The non-transitory, computer-readable storage medium of claim 15, wherein the request indicates a type of data set to be used for evaluating the different classification models, and wherein the sample data set is obtained from a data repository according to the type.

* * * * *